Feb. 9, 1937.   D. H. MORGAN   2,069,966
DOOR STRUCTURE
Filed April 12, 1935   9 Sheets-Sheet 1

Inventor
David H. Morgan,
By
Attorney

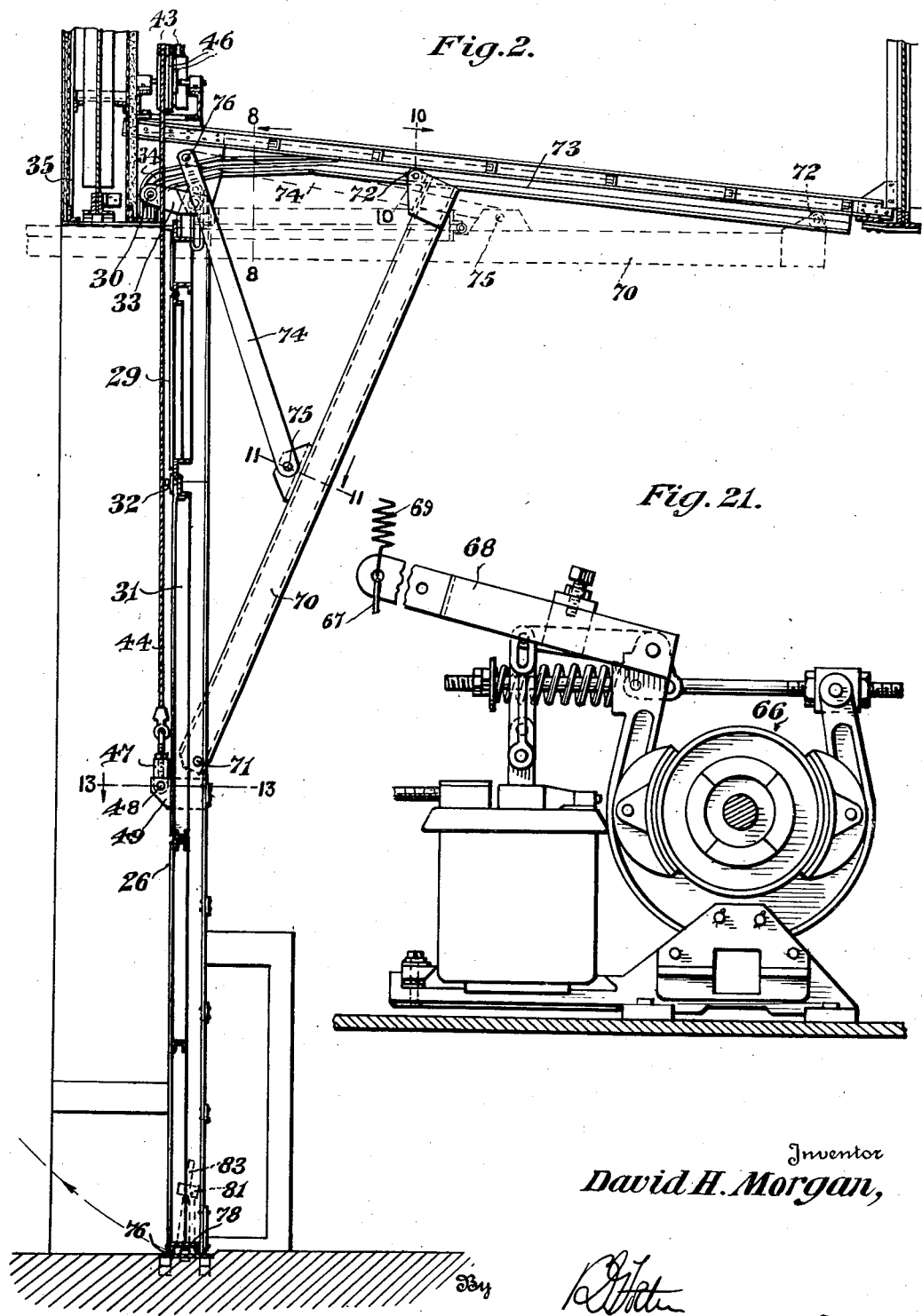

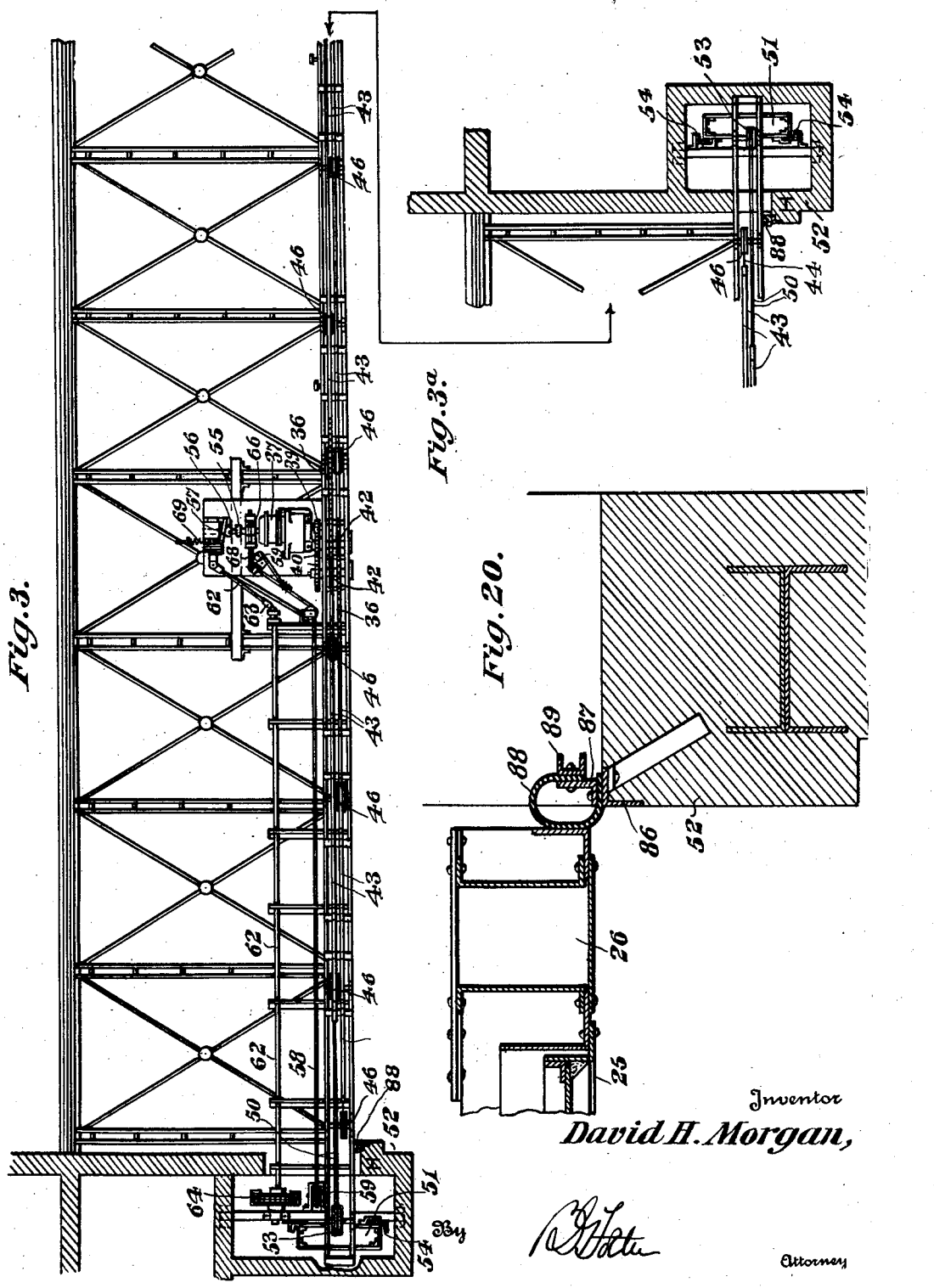

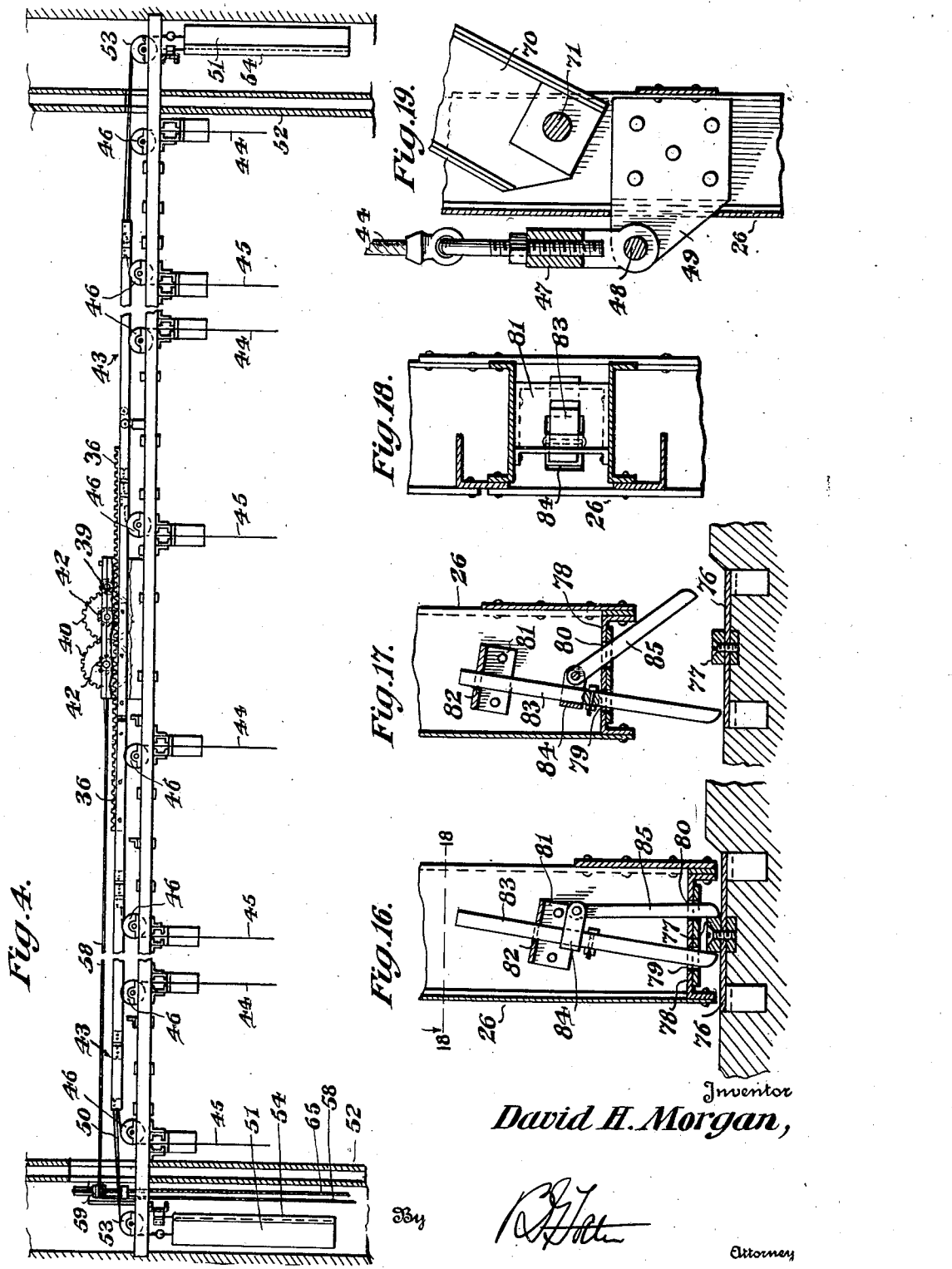

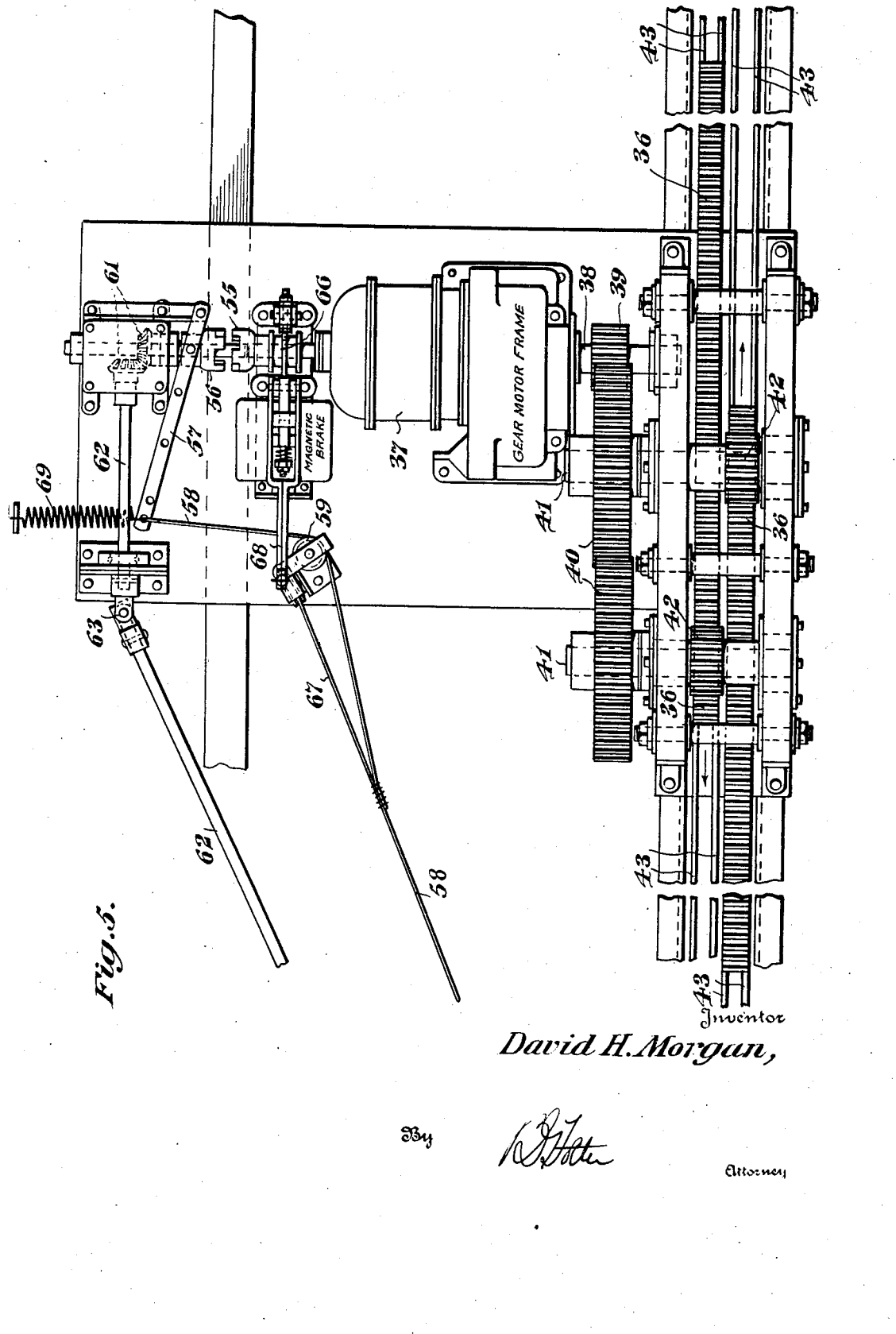

Feb. 9, 1937.   D. H. MORGAN   2,069,966
DOOR STRUCTURE
Filed April 12, 1935   9 Sheets-Sheet 6

Inventor
David H. Morgan,
By
Attorney

Feb. 9, 1937.　　　D. H. MORGAN　　　2,069,966
DOOR STRUCTURE
Filed April 12, 1935　　　9 Sheets-Sheet 7

Inventor
David H. Morgan,
By
Attorney

Feb. 9, 1937. D. H. MORGAN 2,069,966
DOOR STRUCTURE
Filed April 12, 1935 9 Sheets-Sheet 8
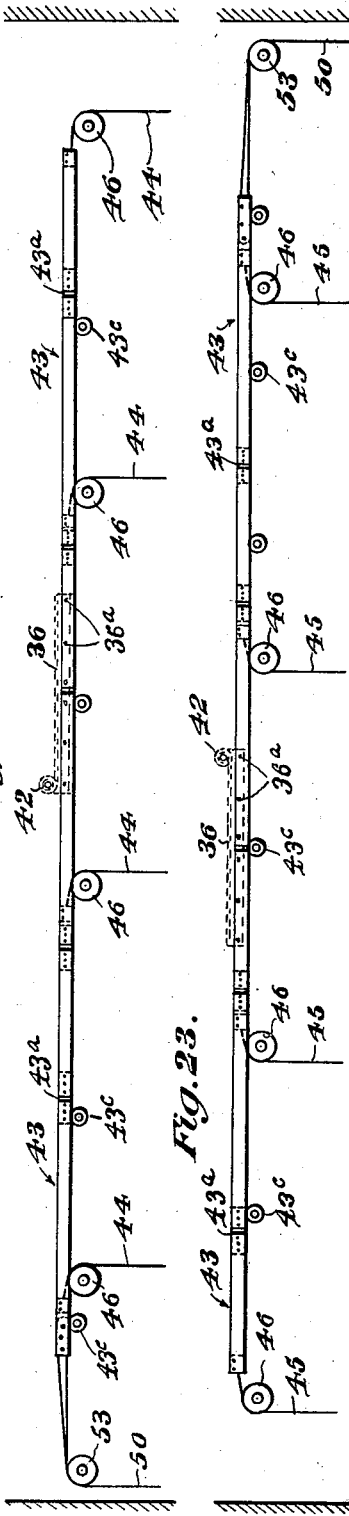
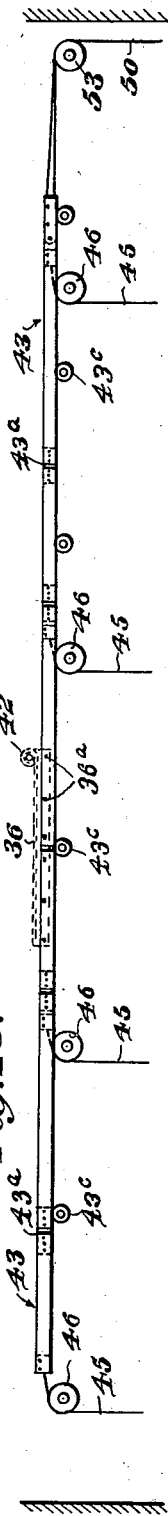
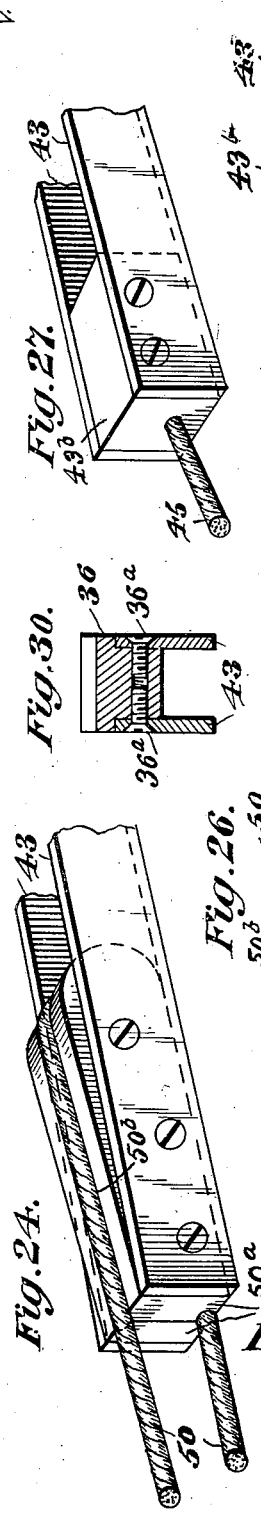
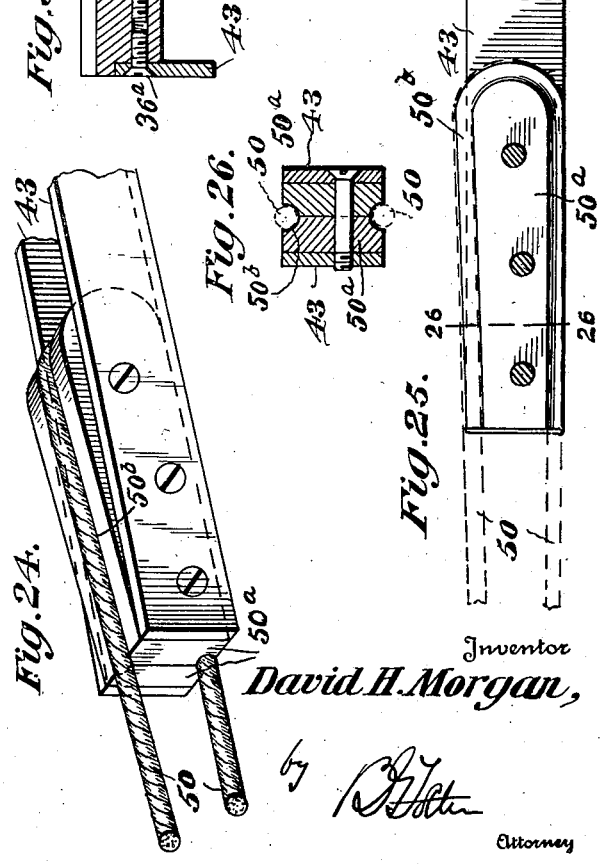
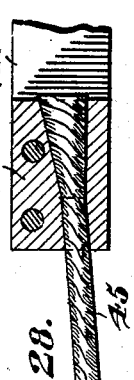
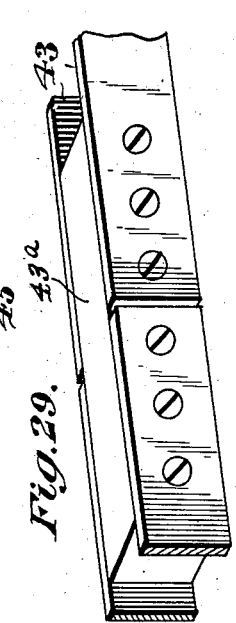
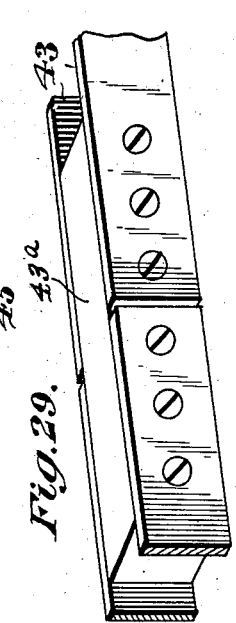
Inventor
David H. Morgan,
by
Attorney

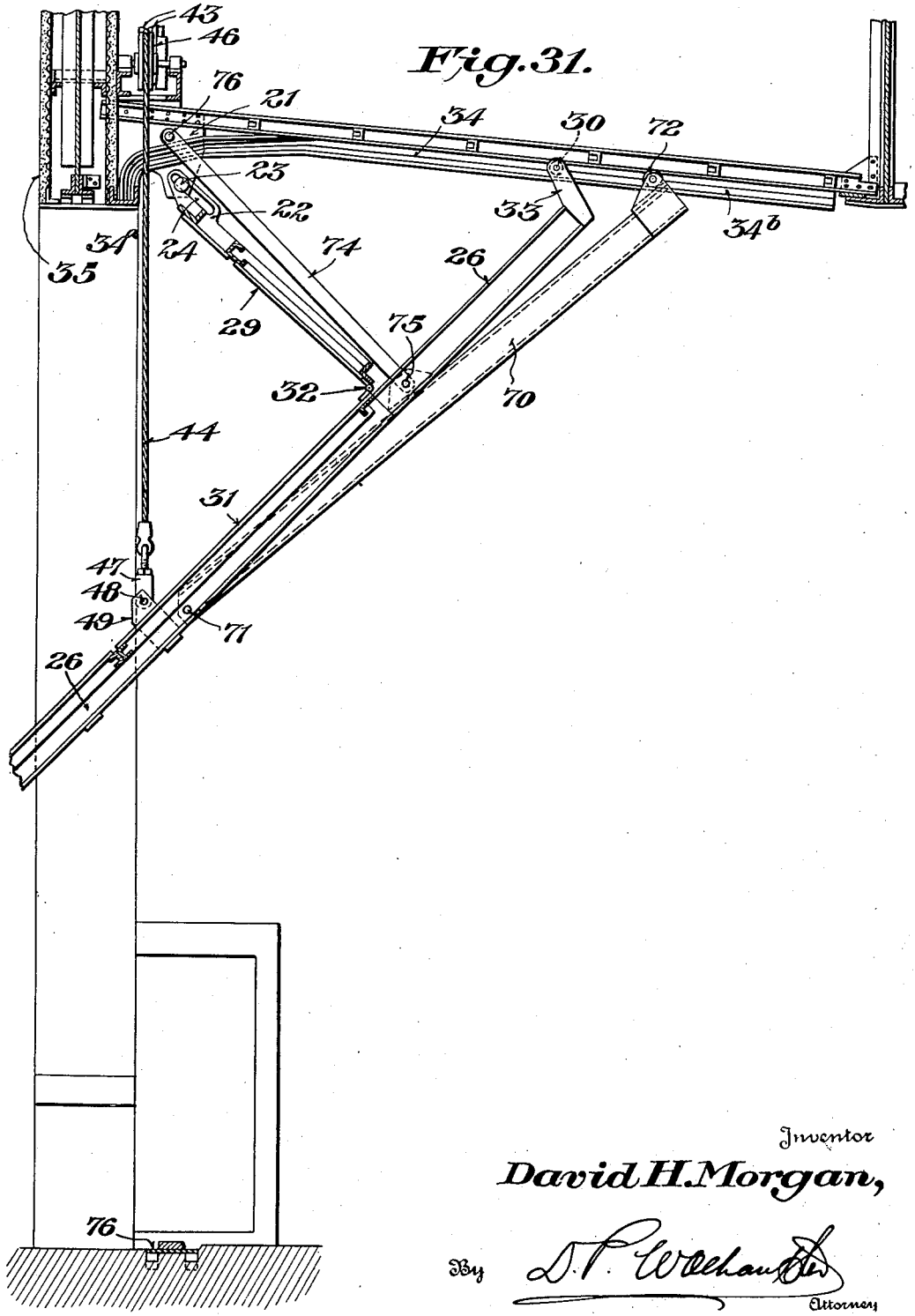

Patented Feb. 9, 1937

2,069,966

UNITED STATES PATENT OFFICE 2,069,966

DOOR STRUCTURE

David H. Morgan, Youngstown, Ohio

Application April 12, 1935, Serial No. 16,074

13 Claims. (Cl. 20—19)

The present invention relates to doors of the type which are elevated to open position, and while specifically the structure is peculiarly useful for large sized doorways or door openings, obviously the invention is not restricted to size or shape.

One of the objects is to provide a structure that can be built and is practically operative under an overhead shallow truss, and in which the load on the truss due to the door does not materially alter as the door assumes its different positions.

Another and important object is to provide a good clearance line in front of the door when it is operating and without materially increasing the usual clearance line at the inside of the door.

A further object is to provide a structure that may be divided up into as many different operating sections or units as the character of the work finds it necessary without the necessity of removable posts or mullions to be placed in the doorway.

A still further object is to provide a structure that will withstand definite wind loads in all its operating positions and to employ operating machinery that will always successfully open the door with the specified maximum wind load on it.

Another object is to provide a door that is commonly balanced in all its positions so that irrespective of its size, it can be readily opened by hand in an emergency.

Still another object is to provide a door or closure structure which when partially opened in cold weather, has a tendency to conserve the heat within the building by having its upper portion so arranged that even if wind is blowing directly toward the door, the upper portion keeps the cold air from blowing directly up into the top of the building structure.

In the accompanying drawings:

Figure 2 is a vertical cross sectional view taken on the line 2—2 of Figure 1;

Figure 1:
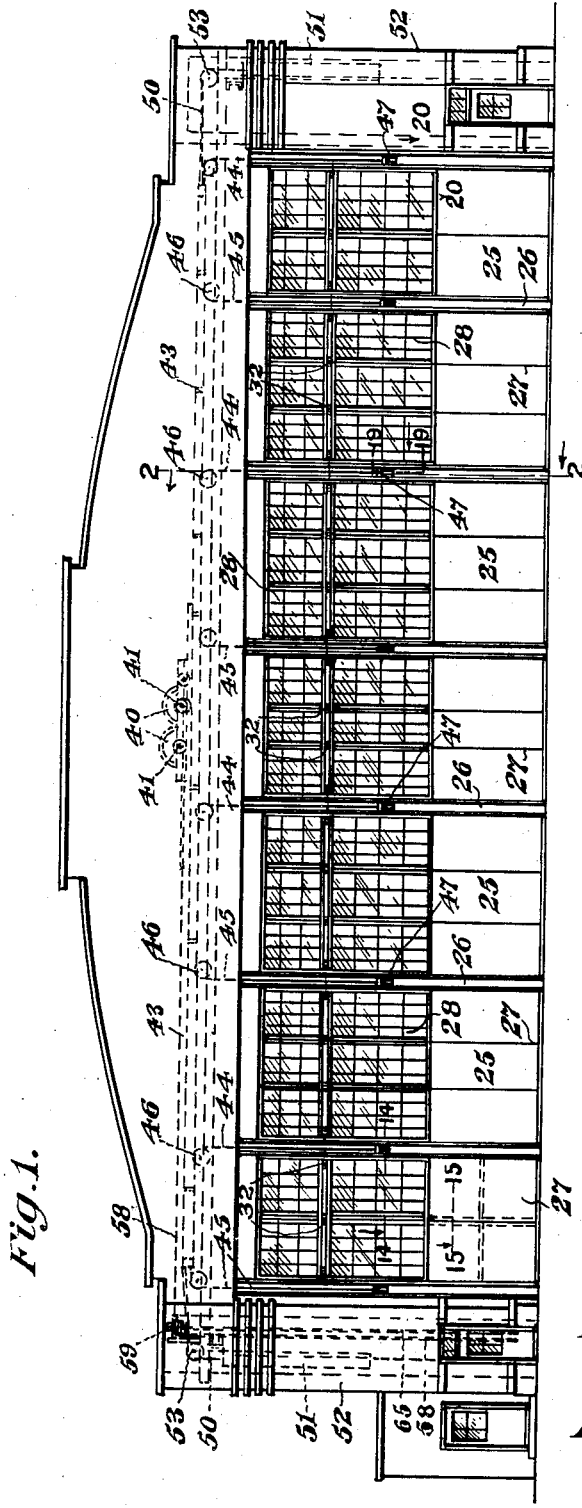
Figure 1 is a view in elevation of a door constructed in accordance with the present invention, and indicating that it may be of very great area.
Figure 15:
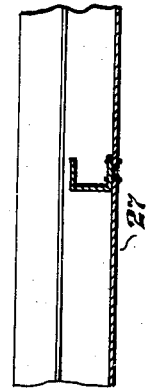
Figure 14:
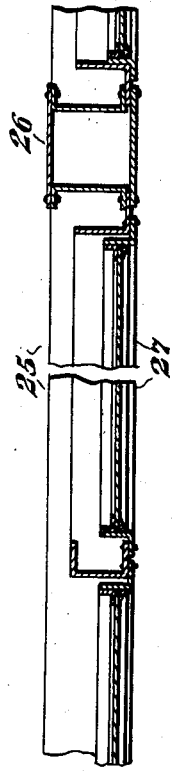
Figure 6:
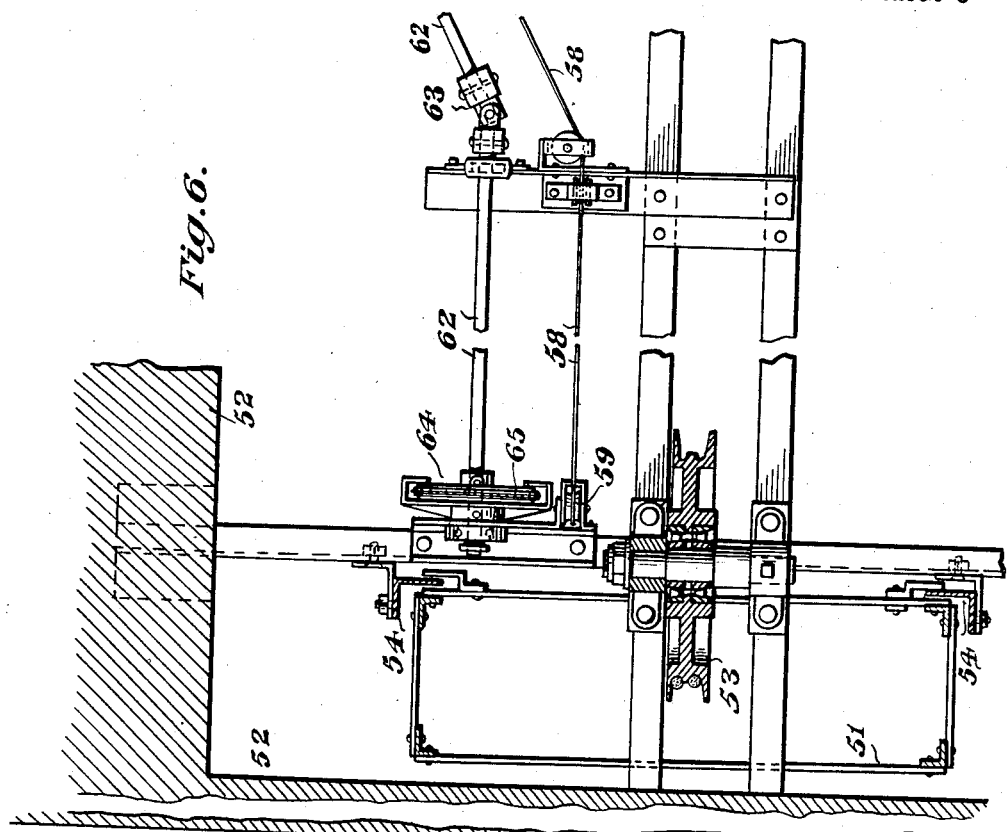
Figure 7:
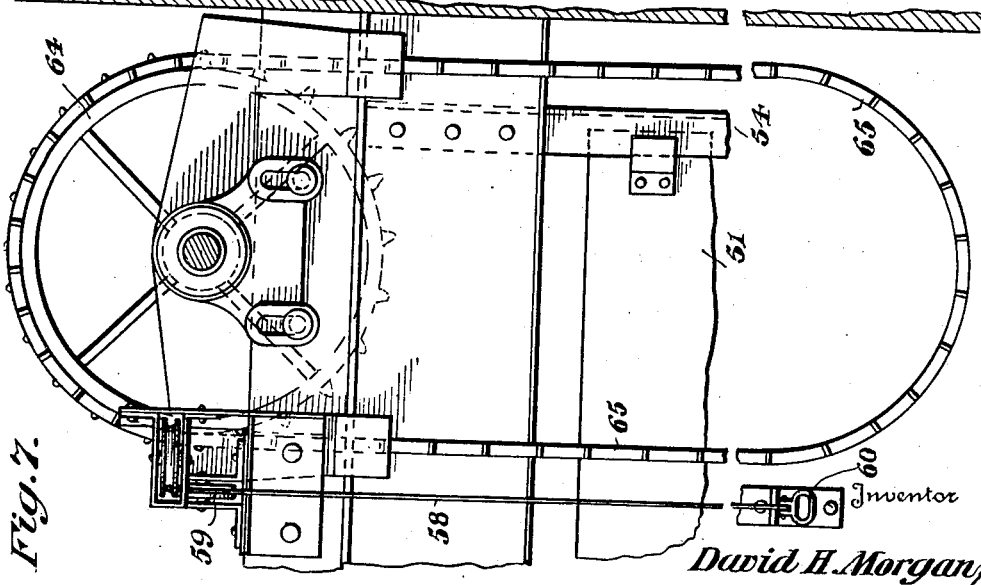
Figure 8:
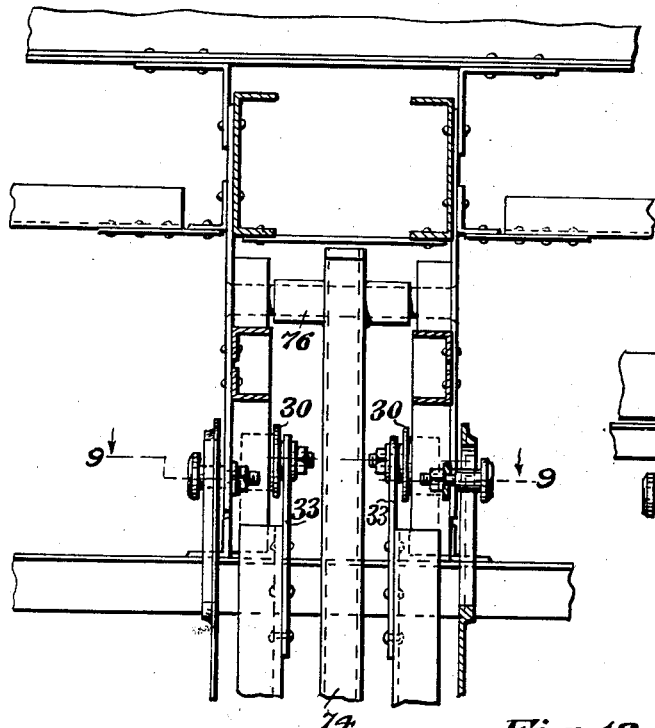
Figure 9:
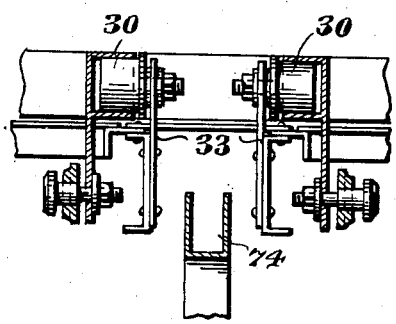
Figures 10, 12, 13:
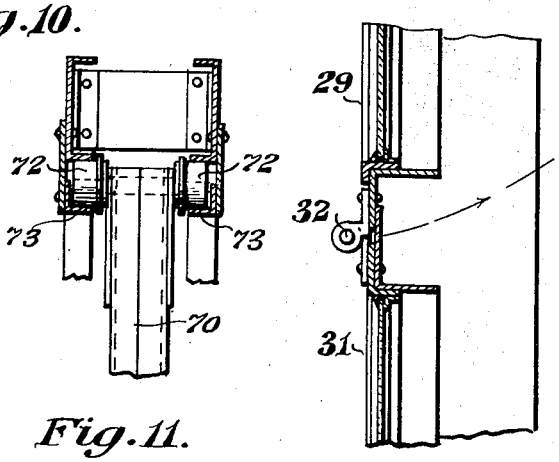
Figure 11:
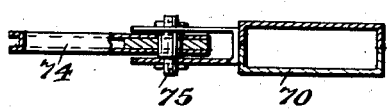

Figures 3—3a together constitute a top plan view of the structure and showing the operating mechanism;

Figure 4 is a front elevation of said operating mechanism;

Figure 5 is a detail plan view of the motor with its controlling means and the operating gearing;

Figure 6 is a detail plan view on an enlarged scale of a portion of the hand operating mechanism in the left-hand door, as shown in plan in Figure 3;

Figure 7 is a view in elevation of the same;

Figure 8 is a detail vertical sectional view on the line 8—8 of Figure 2;

Figure 9 is a detail horizontal sectional view on the line 9—9 of Figure 8;

Figures 10 and 11 are respectively detail sectional views on the lines 10—10 and 11—11 of Figure 2;

Figure 12 is a detail vertical sectional view of one of the hinge connections between the upper and the lower leaf;

Figure 13 is a detail sectional view on the line 13—13 of Figure 2, and showing the means for connecting one of the lifting cables to the lower leaf;

Figures 14 and 15 are respectively detail sectional views on the lines 14—14 and 15—15 of Figure 1;

Figure 16 is a detail vertical sectional view showing one of the locking devices for the lower end of the door when in its closed position;

Figure 17 is a similar view, but showing the relation of the locking parts when the door approaches its lowered position or rises from it;

Figure 18 is a detail horizontal sectional view on the line 18—18 of Figure 16;

Figure 19 is a vertical sectional view on the line 19—19 of Figure 1, and showing the connection of one of the lifting cables and the adjacent end of one of the directing and bracing bars;

Figure 20 is a detail horizontal sectional view showing the weather strip means that is preferably employed along the vertical side edges of the door;

Figure 21 is a detail view in elevation of the brake operating lever;

Figure 22 is a detail side elevation somewhat diagrammatic in its character illustrating one of the elevating bar sets;

Figure 23 is a similar view of the other bar elevating sets;

Figure 24 is a detail perspective view of the mounting for the counterweight cable employed at one end of each of the aforesaid bar sets;

Figure 25 is a longitudinal sectional view through the same.

Figure 26 is a cross sectional view on the line 26—26 of Figure 25;

Figure 27 is a detail perspective view of the cable connector for the opposite end of each bar set to that to which the counterweight is attached;

Figure 28 is a longitudinal sectional view through the same;

Figure 29 is a detail perspective view of one of the couplings for the bar sections;

Figure 30 is a cross sectional view showing the means employed for connecting the bars to the racks; and Figure 31 is a view similar to Figure 2 showing the door partially opened.

The structure as disclosed in Figure 1 shows a single door of great magnitude made up of seven connected units, designated 25. As will be clear, however, said doors may be made in separate units independently operable, and the mechanism therefore is utilizable for doors or like closures irrespective of their size and shape. The units 25 comprise suitable frames having vertical side stiles 26 preferably of tubular construction, as shown in Figure 14, said units having their lower portions in the form of metal panels 27 and their upper portions glazed, as illustrated at 28.

Referring particularly to Figs. 2 and 31 of the drawings, it will be noted that the door as a whole comprises an upper leaf 29 and a lower leaf 31 and that said lower leaf is hingedly connected at its upper end to the lower end of the upper leaf, as indicated at 32. Preferably the upper leaf 29 is of materially less height than the lower leaf 31, the height of said upper leaf in ordinary practice being approximately equal to one-fourth the height of the door.

At its top and at points suitably spaced along its width, the upper leaf 29 is suitably provided with vertical slots 24 in which are disposed hinge pins 23 suitably fixed to the building structure at the top of the door opening. In the present instance the slots 24 are formed in plates 22 riveted, welded or otherwise affixed to the top of the leaf 29, and the hinge pins 23 are carried by plates 21 riveted, welded or otherwise affixed to the building structure. The door thus is connected at its top to the building structure for vertical sliding movement and pivotal or swinging movements.

The stiles 26 extend from top to bottom of the door and are rigid throughout their lengths. In other words, they are not divided into upper and lower sections hingedly connected together as in the case of the door leaves 29 and 31. At their tops said stiles 26 are provided with forwardly extending brackets 33 carrying rollers 30 which operate in guideways 34 suitably mounted at the top of the doorway. As shown, these guideways 34 include short, vertically disposed forward end portions 34a which are disposed to accommodate the rollers 30 when the door is closed, and main length substantially horizontally disposed portions 34b which extend rearwardly from the tops of the portions 34a into the building structure, the said portions 34a and 34b being connected together by rounded portions whereby the rollers 30 are free to travel between said portions 34a and 34b during opening and closing of the door. Obviously, when the door is closed and the rollers 30 are disposed in the vertical portions 34a of the guideways 34 the upper ends of the stiles 26 are held against inward or outward movement.

The door is designed to be raised to open position and the following mechanism is employed for raising and lowering it. Above the top of the doorway and behind the front wall 35 there is located a pair of horizontally disposed racks 36 mounted in suitable guideways and adapted to reciprocate simultaneously in opposite directions. A motor 37 is provided with a shaft 38 having a pinion 39 thereon. This pinion drives a pair of intermeshing gears 40 in opposite directions, and these gears 40 are mounted on jack shafts 41 carrying pinions 42 that mesh with the teeth of the racks 36, and thus serve to effect their movements as aforesaid. Secured to opposite sides of each rack are parallel bars 43 that extend beyond both ends of each rack and are of course reciprocable with them. Fastened to these bars and racks are a plurality of lifting cables, those of one rack and its set of bars extending in one direction and those of the other rack and its bars extending in an opposite direction. These cables are respectively designated 44 and 45 (see Figure 1), and pass over suitable guide pulleys 46, being therefrom extended downwardly, and being secured, as shown at 47, to heads that are pivotally connected, as illustrated at 48 (see Figure 2) to brackets 49 fastened to the vertical stiles 26 of the lower leaf 31. To one end of each set of bars is secured a cable 50, from which hang counterweights 51 that operate in towers 52 located at the opposite sides of the doorway, the cables passing over guide pulleys 53 in the tops of the towers (see Figures 1 and 7). The counterweights in turn operate in suitable guides 54 (see Figures 5 and 6).

The detailed structure of the racks, bars and cable connections as preferably employed is shown in Figures 22–29 inclusive. Thus each rack bar 36 as illustrated in Figure 30 has the extension bars 43 extending along its opposite sides and secured thereto by screws 36a. The extension bars may be made in sections united by coupling blocks 43a (see Figure 29). The mounting for the counterweight cable 50 preferably comprises twin blocks 50a secured between the ends of the extension bars 43 and grooved, as shown at 50b, to provide a seat for the looped portion of the cable. The inner ends of these blocks are rounded. The opposite ends of the same set of extension bars have clamped and fastened to and between them a socket block 43b in which is secured the end of one of the lifting cables 45 (see Figures 27–28). The extension bars are preferably supported at intervals by suitable rollers 43c (see Figures 22–23).

Means are also provided for manually operating the racks in case of an emergency. For this purpose the motor shaft 38 is extended rearwardly and carries on its rear end a clutch member 55 adapted to be detachably engaged by a corresponding clutch member 56 slidable on the shaft and operable by a lever 57 suitably connected thereto. This lever in turn is connected to a pull cable 58 guided around suitable pulleys 59 (see Figures 1, 5, 6), and leading into one of the end towers 52 where it depends and is provided at a convenient height with a suitable pull handle 60 (see Figure 7). The movable clutch member 56 is geared, as shown at 61, to an operating shaft 62 having universal joints 63 therein and extending to the same tower 52. This shaft in the tower is provided with a chain wheel 64, and hung therefrom is an operating chain 65 (see Figure 6). Obviously therefore by pulling upon the cord 58 the clutch member 56 will intermesh with the clutch member 55, and then if the chain 65 is pulled in one direction or the other, the motor shaft 38 will be rotated and operate the parts.

The motor shaft is provided with the usual magnetic clutch 66 for governing its movement and holding the shaft against rotation when the current is cut off from the motor. As it is necessary of course to release this clutch when the shaft 38 is manually rotated, the cable 58 has a branch 67 leading therefrom, and this branch is connected to the brake-operating lever 68 of the magnetic brake. A spring 69 serves to normally hold this lever elevated and apply the brake in the usual manner, but it will be evident that when the cable 58 is pulled upon to connect the clutch members 55—56, the lever 68 will be drawn downwardly against the action of the spring 69 and thus release the motor shaft.

When the door is elevated, the upper leaf 29 swings inwardly and upwardly, thereby carrying the upper edge of the lower leaf 31 in a corresponding direction, but the upper leaf as a whole swings upwardly and outwardly, as will be clear by reference to Figure 31. The consequence is that by reason of the lower leaf being so much wider than the upper leaf, it will project outwardly beyond the doorway and form a canopy. In order to insure the proper operation of the leaves and also to brace the door when it is in closed position, the following mechanism is employed.

A series of directing and brace bars 70 preferably corresponding in number to the vertical stiles 26, is employed. These bars are pivotally mounted at their lower ends, as shown at 71, to the rear side of the lower leaf 31 directly adjacent to the connections of the lifting cables 44—45 and at their upper ends carry rollers 72 disposed in the guideways 34. In order to maintain the proper operation of these directing and brace bars 70, radius bars 74 are preferably employed. They are pivoted, as shown at 75, to intermediate portions of the bars 70 and at their other ends are suitably pivoted, as illustrated at 76, at the top of the doorway, for example, to the plates 21. When the door is closed the bars 70 extend at upward and inward inclinations relative thereto and the bars 74 extend at downward and inward inclinations thereto. Unless the door is raised, thereby to raise the pivot 75, the radius bars 74 serve effectively to hold the upper ends of the bars 70 against rearward movement along the trackways 34. Consequently, when the door is closed, it is effectively braced by the bars 70 against inward movement.

Means are also preferably provided for holding the lower end of the door against lateral displacement when in its closed position. This means, indicated in Figure 2, is shown in detail in Figures 16, 17 and 18. The sill 76 of the doorway is provided with an upstanding rib or bar 77. The vertical stiles 26 have flanged bottoms 78 that receive the rib when the door is closed. These bottoms each have spaced openings 79 and 80 therein, and above the same is a bracket 81 provided with an opening 82. In the openings 79 and 82 is a vertically slidable gripping bar 83 carrying a bracket 84 that is located between the bottom 78 and the bracket 82. On the bracket 84 is pivoted a cooperating gripping bar 85 that extends through the opening 80. The lower ends of the two bars 83 and 85 are below the door, and it will be obvious that as the door raises and the gripping bar 83 drops, the bar 85 will swing away from the bar 83. During the lowering operation the lower ends of the bars 83 and 85 will take positions on opposite sides of the rib 77, and as the door lowers, it will slide downwardly upon such bars, thus bringing them from the position shown in Figure 17 to the position shown in Figure 16, thereby automatically gripping the rib and at the same time moving the lower end of the door to its final closed position.

The building walls at the sides of the door opening are reinforced by angle pieces 86. To these are fastened angle pieces 87, and between each two angle pieces 86 and 87 is clamped one margin of a weather strip 88 which surrounds the angle piece 87 and has its other margin clamped by a channel piece 89. Yieldable, tubular weather strips thus are provided at the sides of the door opening for cooperation with the side edges of the door when the latter is closed.

With this structure it will be evident that the door is ordinarily operable by mechanical power. That is to say, assuming that it is in closed position, it is only necessary to throw a switch in the tower containing the controlling mechanism and thereby energize the motor. When so energized, the two racks are moved in the appropriate opposite directions to pull upon all the cables and thereby raise the door, at the same time swinging the upper leaf inwardly and the lower leaf outwardly, while the directing and brace bars, as already explained, move to substantially horizontal positions. The entire area of the doorway is thus open, and it will be noted that in this opening movement the upper part of the building being kept closed, there is not the loss of heat that would be occasioned by an opening created at the top of the doorway.

If in an emergency, as when the current fails, and it becomes desirable to open the door, a pull upon the cable 58 clutches the hand-operating mechanism to the motor shaft and unclutches the brake so that by operating the chain 65, the door can be raised by hand. When closed it is very effectively braced at different points by the bars behind it. It will be noted that the door can be built and will successfully operate under a shallow truss. The loading, due to the door, does not materially change as the door assumes its different positions. It provides a good clearance line in front during its operation. It may be divided into as many operating sections as is found desirable, or in other words, this mechanism can be used either with one large door or a number of independently movable door sections. It can be constructed to withstand definite wind loads and these loads can be accurately calculated in advance. The door is counterbalanced in all its positions, and since the top leaf has a definite connection at the top of the doorway, the door when partially opened in cold weather, has a tendency to conserve the heat within the building.

Assuming that the door is closed and that either the motor 37 or the manually operable means is actuated to open the same, the action which takes place is as follows: First, the stiles 26 and, with them, the upper and lower door leaves 29 and 31, while vertically aligned, are moved upwardly a short distance, permitted by the slotted pivotal connections between the top of the upper leaf 29 and the building and by the vertically disposed forward end portions 34a of the trackways 34, until the bars 83 and 85 become disengaged from the rib 77. Then, by continued upward movement of the stiles 26 and, with them, the lower leaf 31, the rollers 30 at the tops of the stiles 26 are caused to move rearwardly into the substantially horizontally disposed portion 34b of the trackway 34, thereby causing the stiles and the lower door leaf 31 to become upwardly and inwardly inclined. This results in the hinge connections 32 between the upper and lower leaves 29 and 31 being moved inwardly, and since the top of the upper leaf 29 is held against inward or outward movement it follows that the upper leaf is swung upwardly and inwardly. At the same time, the upper ends of the brace bars 70 move inwardly and the radius bars 74 swing upwardly and inwardly about their pivots 76 until, finally, by continued upward movement of the cables 44, the brace bars 70, and the door leaves assume horizontal or substantially horizontal positions with the upper leaf 29 overlying the lower leaf 31 and the bottom portion of the said lower leaf extending through and forwardly beyond the door opening in the form of a canopy at the top thereof. Upon slackening of the cables 44 the door is returned by gravity to its closed position and when it finally reaches its fully closed position it is secured at its bottom against inward or outward movement by the cooperation of the bars 83 and 85 with the rib 77 and is held at its top against inward or outward movement because of the rollers 30 at the upper ends of the stiles 26 being disposed in the vertical portions 34a of the guideways 34.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A building structure having a doorway, a door for the doorway comprising hingedly connected leaves that swing in opposite directions upwardly, a bar pivoted at one end to one of the leaves for directing the swinging movements of the leaves, a guideway along which the other end of the directing bar moves, and a radius rod having a fixed pivotal mounting at one end and also having a pivot connection with the directing bar.

2. A building structure having a doorway and a door for the doorway comprising an inwardly and upwardly swinging upper leaf and an outwardly and upwardly swinging lower leaf hinged to the upper leaf, a rearwardly extending guideway at the top of the doorway, a directing bar having one end slidable in the guideway and its other end pivoted to the lower leaf, a radius bar pivoted at one end to a fixed part of the building structure and pivotally connected at its other end to said directing bar intermediate the ends of the latter, and means for lifting the door.

3. A building structure having a doorway and a door for the doorway comprising an inwardly and upwardly swinging upper leaf and an outwardly and upwardly swinging lower leaf hinged to the upper leaf, a rearwardly extending guideway at the top of the doorway, a directing bar having one end slidable in the guideway and its other end pivoted to the lower leaf, a radius bar pivoted at the upper end of the doorway and pivoted to an intermediate part of the directing bar, and means for lifting the door.

4. A building structure having a doorway and a door for the doorway comprising an inwardly and upwardly swinging upper leaf and an outwardly and upwardly swinging lower leaf hinged to the upper leaf, a rearwardly extending guideway at the top of the doorway, a directing bar having one end slidable in the guideway and its other end pivoted to the lower leaf, a radius bar pivoted at the upper end of the doorway and pivoted to an intermediate part of the directing bar, and an elevating cable connected to the outer side of the lower leaf adjacent its connection with the directing bar.

5. A building structure having a doorway and a door comprising a plurality of units having upstanding side frame beams, said units consisting of upper narrow leaves pivotally mounted at their upper ends and swinging inwardly, and lower wider leaves hinged to the upper leaves and swinging outwardly, a plurality of lifting cables depending from the top of the doorway and connected to the outer sides of the side bars of the lower leaves, directing bars pivoted to the inner sides of the side bars of the lower leaves and having upper rear ends slidable rearwardly of and above the doorway, and radius bars for the directing bars pivoted to the latter and at points above the doorway.

6. A building structure having a doorway, a door for the doorway, comprising an upper upwardly and inwardly swinging leaf, a lower upwardly and outwardly swinging leaf hinged to the upper leaf, oppositely reciprocatory racks above the door, means for moving the racks in opposite directions, oppositely extending hoisting cables connected to the racks and having depending portions connected to the lower leaf at different points along the door, downwardly extending directing and bracing bars pivoted to the lower leaf adjacent the cable connections, guideways in which the upper ends of the bars slide, and radius bars pivotally mounted on the building structure and on the directing and bracing bars.

7. A building structure having a doorway, a door for the doorway adapted to be raised to open position, an upwardly projecting locking element at the sill of the doorway, a pair of gripping jaws at the lower portion of the door adapted to embrace the locking element when the door is lowered, and means on the door responsive to engagement of one of the jaws with the locking element when the door is lowered for causing the jaws to relatively move and grip the locking element therebetween.

8. A building structure having a doorway, a door for the doorway adapted to be raised to open position, a locking element at the sill of the doorway, a pair of pivotally connected gripping jaws slidably mounted on the lower portion of the door adapted to embrace the locking element when the door is lowered, and means on the door for causing the jaws to move toward each other and grip the locking element therebetween when the door is lowered.

9. A building structure having a doorway, and an upwardly opening door for closing the doorway, said door comprising hingedly connected leaves that fold together when elevated, downwardly and forwardly extending brace bars behind the door and pivoted thereto, the upper rearward ends of said bars having sliding mountings that cause the bars to move rearwardly and upwardly when the door is elevated to open position, and means holding the upper ends of the brace bars against rearward movement when the door is closed.

10. A building structure having a doorway, a substantially horizontally disposed guideway within the building structure at the top of the doorway, the forward end portion of said guideway being directed downwardly and being substantially vertically disposed, a door including vertical stiles guided at their upper ends in said guideway, a lower door leaf carried by said stiles, an upper door leaf hinged at its bottom to the top of said lower door leaf and having pivotal sliding connection at its top with the building structure adjacent to the top of the doorway, and means for raising and lowering said stiles.

11. A building structure having a doorway, a door for said doorway including stiles vertically disposed when the door is closed, a lower door leaf carried by said stiles, an upper door leaf hinged at its bottom to the top of said lower door leaf and having pivotal sliding connection at its top with the building structure adjacent to the top of the doorway, means for raising and lowering the stiles, means to hold the tops of the stiles against inward and outward movements when the door is closed, said means being releasable by initial upward door opening movement of the stiles, and means to cause the upper ends of the stiles to move substantially horizontally inwardly following initial upward movement thereof, thereby to cause the upper door leaf to swing upwardly and inwardly and the lower door leaf to swing upwardly and outwardly.

12. The combination as set forth in claim 10 including brace bars at the inner side of the door pivoted at their bottoms to the stiles and guided at their tops for substantially horizontal movement, and radius bars pivoted at their tops to fixed parts of the building structure and at their bottoms to said brace bars intermediate the ends of said brace bars.

13. The combination as set forth in claim 11 including brace bars at the inner side of the door pivoted at their bottoms to the stiles and guided at their tops for substantially horizontal movement, and radius bars pivoted at their tops to fixed parts of the building structure and at their bottoms to said brace bars intermediate the ends of said brace bars.

DAVID H. MORGAN.